June 4, 1968  Q. A. HANSEN  3,386,545
ALTERNATIVELY OPERABLE COUPLINGS WITH INTERVENING ACTUATOR
ENCIRCLING THRUST ROD IN SPLINE OF HUB
Filed May 18, 1966  3 Sheets-Sheet 1
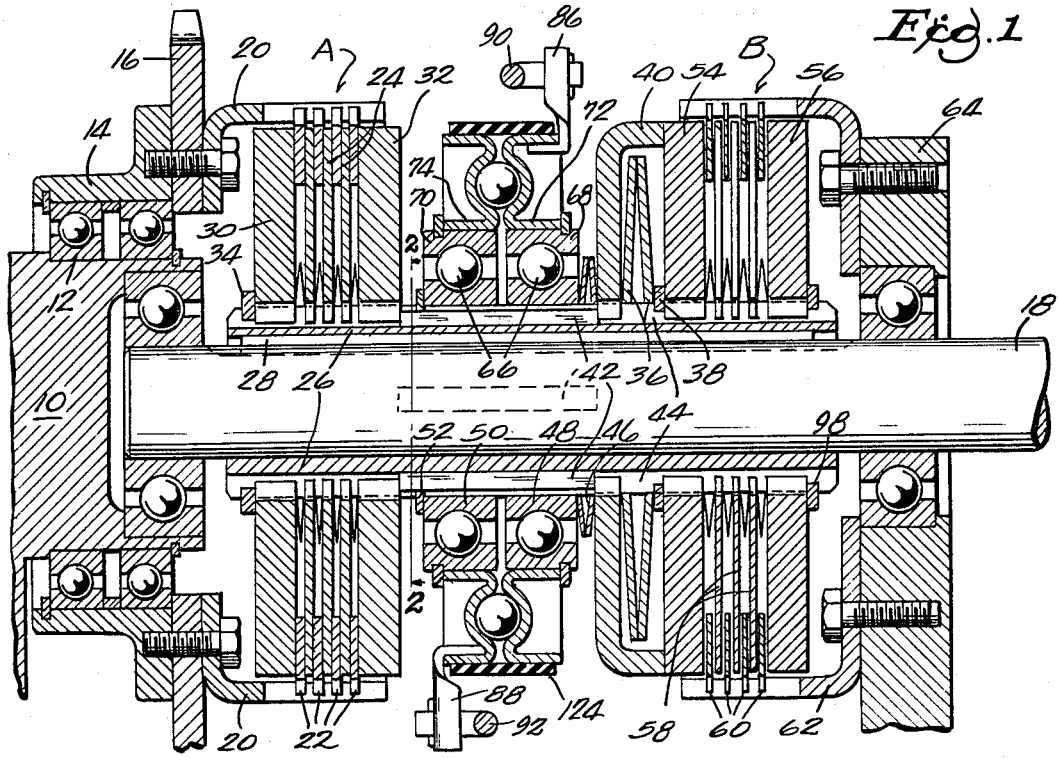
Fig. 1
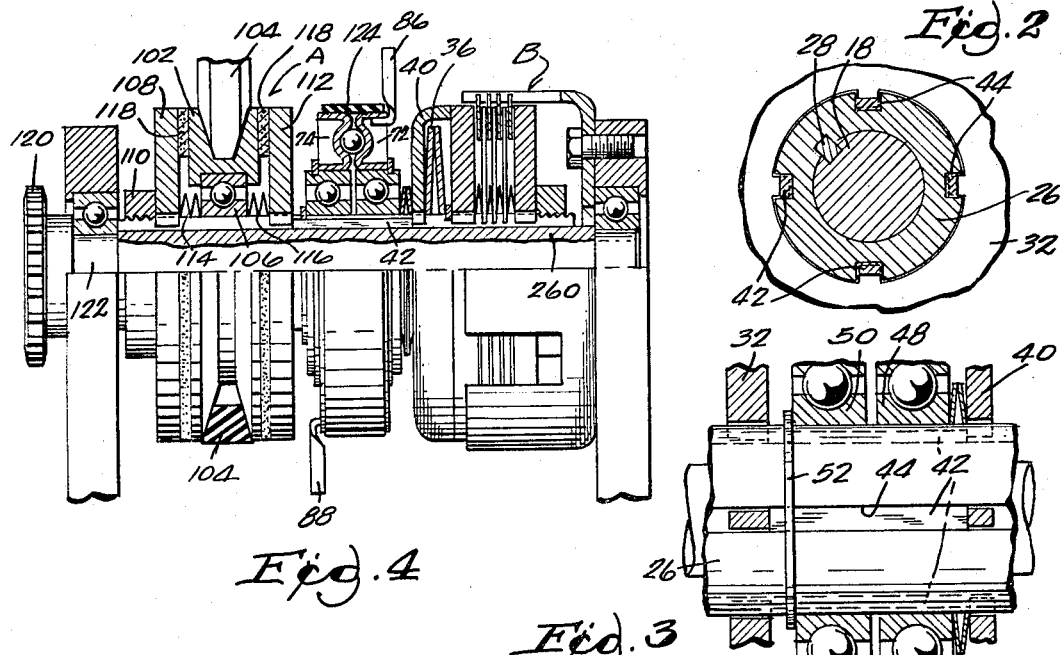
Fig. 2
Fig. 4
Fig. 3
INVENTOR
QUINTEN A. HANSEN
BY Wheeler, Wheeler & Wheeler
ATTORNEYS

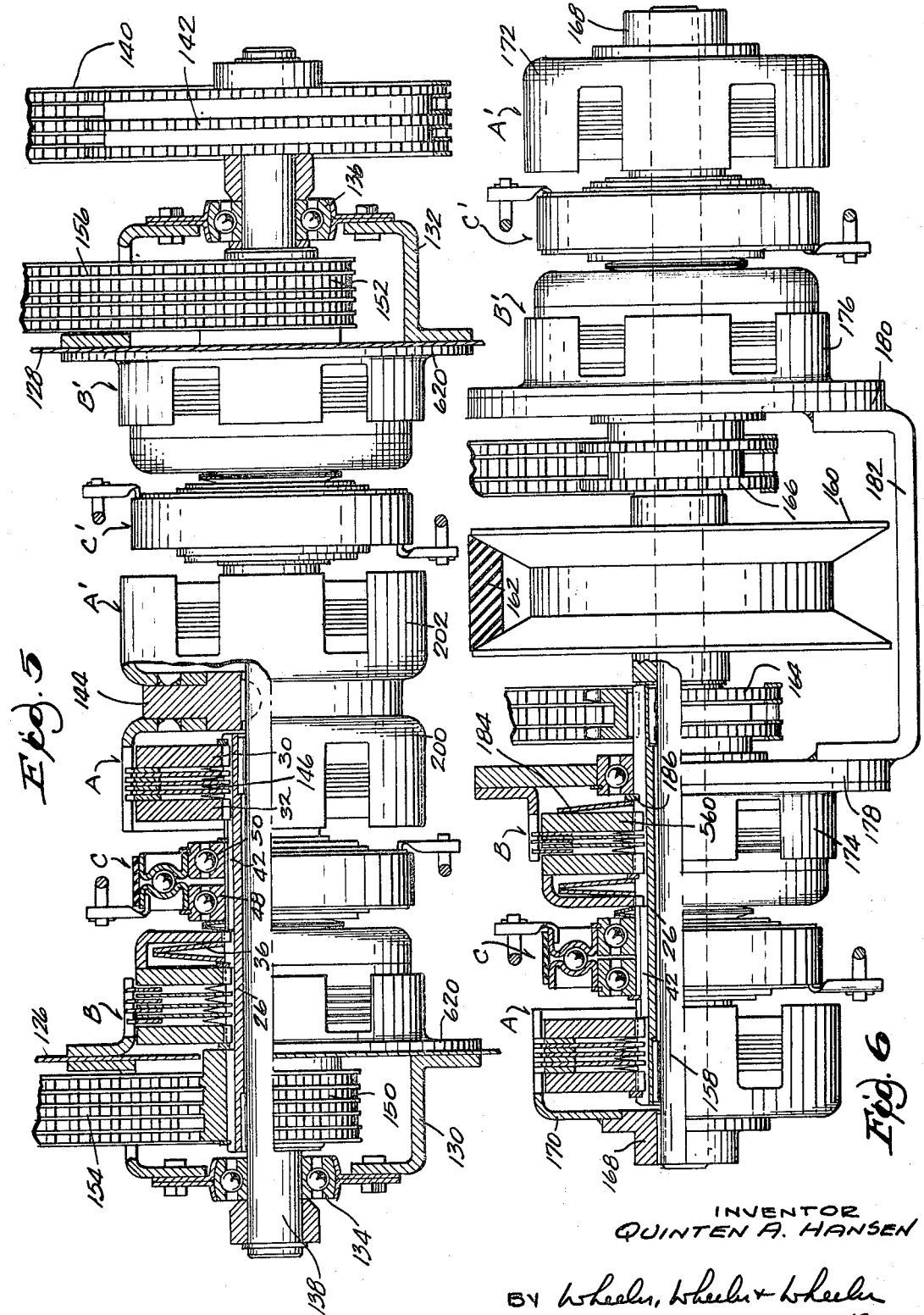

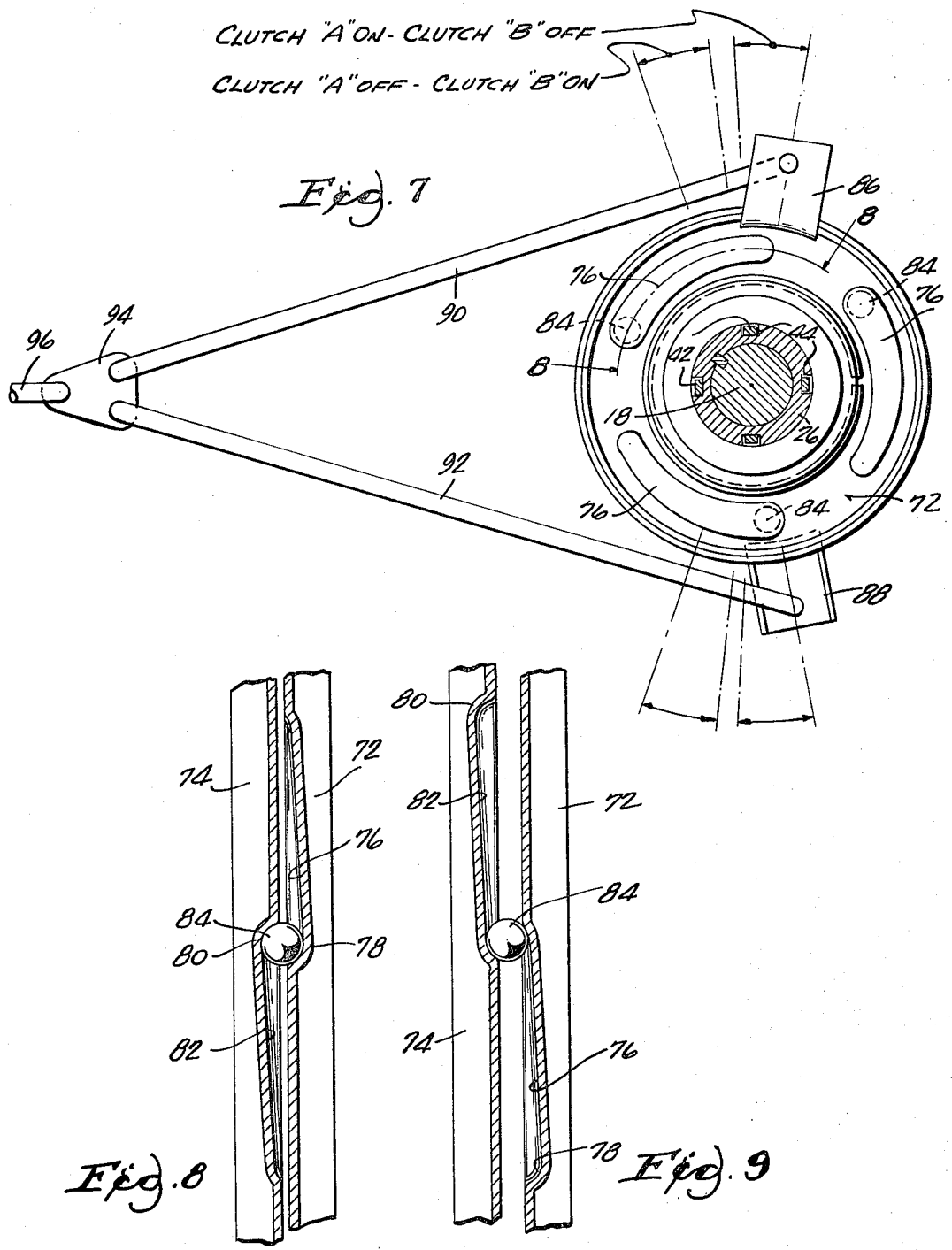

United States Patent Office 3,386,545
Patented June 4, 1968

3,386,545
ALTERNATIVELY OPERABLE COUPLINGS
WITH INTERVENING ACTUATOR EN-
CIRCLING THRUST ROD IN SPLINE OF
HUB
Quinten A. Hansen, 4338 Highway 38,
Franksville, Wis. 53126
Filed May 18, 1966, Ser. No. 551,098
8 Claims. (Cl. 192—18)

ABSTRACT OF THE DISCLOSURE

Two couplings have disks splined to the same hub, their pressure plates being engaged by an intervening thrust rod reciprocable through one of the splines. The couplings are actuated in one direction by spring bias and in the other by a ball cam encircling the thrust rod.

---

This invention has many uses, one of which is a device in which the clutch is normally engaged and the driven part is subjected to braking action as soon as the clutch is disengaged. A commercial application employing this principle is one in which there are two associated mechanisms for the respective driving of propulsion wheels or tracks of a vehicle such as a snow mobile or tractor in which steering is effected by interrupting power transmission and concurrently braking the drive at one side of the vehicle.

Since normally the power train to the driven part is operative, a single spring may be used to engage the clutch and disengage the brake. If the brake were normally operative, the arrangement would be reversed. A ball wedge of the general type indicated in my Patent No. 3,127,969 is preferably used to apply thrust against the bias of said single spring for disengaging whichever disks are normally engaged and bringing about the engagement of the disks which are normally disengaged.

Preferably the ball wedge mechanism is disposed between the clutch and brake and the bias of the spring is transmitted by thrust rods which operate in the splines provided between the clutch and brake disks and the member controlled thereby. These thrust members occupy less than the total depth of the splines so that split rings or the like may be used as thrust collars in grooves which encircle the splines outside of the thrust rods.

In the drawings:

FIG. 1 is a view in axial section through an embodiment of the invention.

FIG. 2 is a detail view taken in transverse section on the line 2—2 of FIG. 1.

FIG. 3 is a fragmentary sectional view similar to FIG. 1 and differing therefrom in that the driven member is shown in elevation.

FIG. 4 is a fragmentary view partially in section and partially in elevation showing a modified embodiment of the invention.

FIG. 5 is a view partially in section and partially in elevation showing a modified embodiment of the invention not only illustrating a slightly different embodiment but showing how the device may be used to control two separate output motion-delivering trains powered by a single input.

FIG. 6 is a view partially in elevation and partially in section showing another duplex modified embodiment of the invention.

FIG. 7 is a diagrammatic view showing how the ball wedge device is actuated from a single control link.

FIG. 8 is an enlarged fragmentary developed view taken on the section indicated at 8—8 in FIG. 7, and showing the ball wedge parts in their collapsed position.

FIG. 9 is a view similar to FIG. 8 showing the parts in their expanded position.

Referring first to the embodiment shown in FIG. 1, a fixed member 10 provides support by means of bearings 12 for hub 14 of a driving sprocket 16. The shaft 18 is the driven member of the device.

The coupling generically designated by the reference character A comprises a driving bell 20 to which are splined the driving clutch disks 22 interleaved between driven clutch disks 24 splined to a sleeve 26 fixed to the driven shaft 18 by means of key 28. A compression plate 30 and a compression plate 32 are disposed at opposite sides of the series of disks 22 and 24 and likewise serve as driven disks, being splined to sleeve 26. Plate 30 engages a split thrust ring 34 set in a peripheral groove of sleeve 26.

With the several disks engaged under pressure between the plates 30 and 32 as shown in FIG. 1, motion will be transmitted from the driving sprocket 16 to the sleeve 26 and thence to the shaft 18. The pressure bias which urges plate 32 toward plate 30 to press the several clutch disks against each other is provided by a large Belleville spring 36. This spring is seated against snap ring 38 and which urges the cup 40 to the left as viewed in FIG. 1, motion being transmitted from cup 40 to plate 32 through a series of push rods 42 disposed in the several spline channels 44 of the sleeve 26 as best shown in FIGS. 2 and 3. The Belleville spring 46 urges bearing races 48 and 50 of the ball cam device (later to be described) toward the snap ring 52.

The brake device is really a coupling which is normally disengaged in the instant device but may be engaged to clutch the driven shaft 18 to a fixed part. The brake device is designated by reference character B. It comprises pressure plates 54 and 56 splined to sleeve 26 and thereby connected to shaft 18. Between these plates are the interleaved brake disks 58 and 60. Brake disks 58 are splined to the sleeve 26, while the brake disks 60 are splined to a fixed bell member 62 comparable to the driving bell member 20. Bell member 62 is bolted to a frame part 64 which has bearings for shaft 18, as does frame part 10.

Reference has been made to the bearing races 48 and 50 which encircle sleeve 26. These ball races respectively are encircled by the outer ball races 68 and 70 to comprise thrust bearings having the usual balls 66 therein.

Mounted on the respective outer races 68 and 70 are the complementary ball cam members 72 and 74. Each of these is desirably provided with an outwardly extending web in which there is a cam channel obliquely inclined to be of progressively varying depth. As best shown in FIGS. 8 and 9, the cam channel 76 of member 72 has its greatest axial depth at 78 opposite the maximum-depth portion 80 of the cam channel 82 provided on the cam wedge member 74. The camming ball 84 is normally seated in the portions of maximum depth 78 and 80 of the respective channels 76 and 82. Upon relative movement between members 72 and 74 between the relative position of FIGS. 8 and 9, the ball cams the members apart axially. There are preferably a plurality of these sets of opposed channels in each set of ball cam members 68 and 70, three being shown in FIG. 7.

The ball cam members 72 and 74 are provided with radial arms 86 and 88 which project in a generally opposite direction, although they are not diametrically opposite, being slightly off center as shown in FIG. 7. The links 90 and 92 connect the arms 86 and 88 through couplings 94 to a cam actuating rod 96. With the balls in the deepest parts of the complementary cam grooves 76, 82, as shown in FIGS. 7 and 8, the said members will be in close proximity. This position of the parts is also shown in FIG. 1. When the actuating rod 96 is subjected to tension to the left as viewed in FIG. 7, the ball clutch member 72 will be oscillated counterclockwise and the member 74 will be oscillated clockwise, thereby causing the channels 76 and 82 to advance rotatably in opposite directions with respect to the intervening ball 84. Due to the progressively decreasing depth of the channels, the ball will wedge the members 72 and 74 axially apart and this motion will be communicated through the thrust bearings upon which such members are mounted. Since the inner race 50 abuts snap ring 52, all movement must be developed to the right as viewed in FIGS. 1 and 8 whereby the pressure of ball cam member 72 will be communicated through the spring 46 to the cup 40 which houses Belleville spring 36. In other words, the separation of member 72 from member 74 of the ball cam device has to overcome the bias of spring 36, forcing the movable brake plate 54 toward the fixed brake plate 56. The latter is precluded from movement by snap ring 98 on the sleeve 26. This engages with each other the several brake disks 58 and 60 to arrest frictionally the rotative movement of shaft 18.

The legends in FIG. 7 generally indicate the range of oscillatory movement which controls the driving clutch and the braking clutch, this being merely by way of example and not by way of limitation. At some indeterminate point which is not fixed in the instant mechanism, there is slight slippage or may be briefly a neutral position in which the drive to the shaft 18 is no longer fully effective but the brake has not yet been fully applied.

Upon relief of tension of rod 96, the parts will be restored by the thrust of Belleville spring 36 on the thrust bearing race 48 to push the ball cam members 72 and 74 together, thereby restoring the parts to the position shown in FIG. 8, and relieving the brake and reapplying the clutch. As already stated, the thrust of the actuating spring 36 is transmitted through the push rods 42 to the clutch applying plate 32.

FIG. 4 shows a modified embodiment which operates on substantially the same principle. Here the pulley 102 is the driving element, actuated by a belt 104. The end faces of the pulley are planiform so that it serves as a driving clutch plate. The pulley is supported by a conventional ball bearing 106 from a sleeve 260 which corresponds to the sleeve 26 previously described. The driven clutch plate 108 is splined to the sleeve and abuts a ring nut 110 threaded to the sleeve. The driven clutch plate 112 is likewise splined to the sleeve but is movable axially on the sleeve. The Belleville spring 36 already described exerts pressure through the push rods 42, disposed in splines of the sleeve as shown in FIG. 2 so that the clutch plate 112 is biased toward unyieldable clutch plate 108 upon drive plate 102. Belleville springs at 114 and 116 separate the parts when the thrust of push rods 42 is relieved. Friction bands 118 may be used if desired.

The ball cam structure operates in the manner already described to overcome the bias of spring 36 and to exert pressure through the cup 40 upon the interleaved disks of the brake B, there being no substantial change in the brake structure. By way of exemplification, a gear 120 on the shaft 122 represents one way in which power can be taken from such shaft or the output may be braked according to the functioning of the ball cam device as shown.

An elastomeric band 124 may optionally be used to encircle the ball cam elements 72 and 74 to exclude foreign matter.

FIGS. 5 and 6 exemplify other arrangements of power input and output in devices which also exemplify duplication of the clutch and brake mechanisms for use, for example, when it is desired to control the steering of a wheeled or track-laying vehicle by braking the functioning of the propelling means at one side of the vehicle while allowing the power to remain effective upon the propelling mechanism at the other side of the vehicle.

In the FIG. 5 construction frame or body members are shown at 126 and 128. Bearing housing 130 and 132 are provided with bearings 134 and 136 for the driving shaft 138 which is operated in any appropriate manner, as by chain 140 and sprocket 142. A driving head 144 is connected with the driving bells 200 and 202 of the two separate clutch sets A and A.' Each of these includes pressure plates 30 and 32 as already described. Each may optionally be provided with clutch releasing Belleville springs 146 between the driven plates to assure immediate clutch release when plate 32 is relieved of the thrust of the main Belleville spring 36 in the manner already described. Each releasing spring may optionally be used, incidentally, in the device of FIG. 1. They have already been illustrated in FIG. 4.

At each side of the driving head 144 and beyond the respective clutch units A and A' are the operating ball camming devices C and C' respectively and the brake units B and B'. The respective bell members 620 of the brake units B and B' are mounted on the frame or body elements 126 and 128 through which the respective sleeves 26 extend (only one being exposed in FIG. 5) to operate the multiple sprockets 150 and 152 which drive the output chain sets 154 and 156 respectively. As already stated, one of these will normally drive the vehicle-propelling means at one side of the vehicle and one will drive the propelling means at the other side, assuming the structure to be used in such a vehicle.

The device of FIG. 6 is very similar to that of FIG. 5 except that the power input to the shaft 158 comprises a pulley 160 driven by a belt 162. Here the drive is from the ends of the shaft 158 inwardly toward the output sprockets 164 and 166 respectively. At each end of shaft 158 is a hub 168 keyed thereto. The respective bells 170 and 172 may be welded to these hubs. Each of the bells is the driving element of one of the clutches A and A' respectively. The brake units B and B' respectively have their fixed bell portions 174 and 176 respectively mounted by plates 178 and 180 to a fixed yoke 182. The operation by which the brakes and clutches are respectively engaged and disengaged between both cam control units C and C' is substantially the same as already described. Specifically, however, the brake shown in FIG. 6 differs slightly in the fact that one of its plates 560 is subject to the bias of a dished spring 184 seated against stop ring 186 on the sleeve 26.

I claim:

1. In combination, a driven member, a driving member, a first releasable coupling device for the driven member, a second releasable coupling device for connecting the driving member with the driven member, oppositely movable actuator means respectively connected with the said coupling devices, a spring biasing said actuator means in a direction to release one said device and engage the other, and manually operable means for overcoming the bias of said spring for engaging said one device and releasing the other, said devices comprising a pair of axially aligned couplings having a common hub having splines, each coupling individually comprising disks having splines engaged with corresponding splines of said hub, other disks interleaved with the disks splined to the hub, each coupling having a pressure plate clampingly engaging said other disks with the disks splined to the hub, and means slidable in at least one of said corresponding splines of the hub for transmitting motion from the pressure plate of one coupling to the plate of the other coupling.

2. A combination according to claim 1 in which each of said couplings includes a cup to which said other disks are splined, one such cup including a relatively fixed anchorage and the other such cup including a motion transmitting connection.

3. A combination according to claim 1 in which said spring is a compression spring having a seat on the hub and acting on said slidable means of said first coupling for clampingly engaging the disks of the first coupling with the driving member, the first said coupling being relieved of spring bias when said actuator means is moved to apply clamping pressure to the disks of said second coupling.

4. A combination according to claim 1 including ball cam means for exerting axial pressure on said actuator means in opposition to said spring.

5. In combination, a splined driven rotor, first and second clutches encircling the rotor and each comprising a set of disks including at least one disk splined to the rotor and at least one other disk frictionally engageable therewith, means providing opposing shoulders on the rotor limiting the movement in opposite directions of the disks of the respective sets, each clutch including a pressure applying plate, the plates being movable in opposite directions along the rotor toward the respective shoulder means, a cup movable axially of the rotor and engaged with one of said plates, a manually operable camming device upon the rotor between the clutches, a stop on the rotor abutted by the camming device, means for transmitting motion from the camming device to said cup in a direction away from said stop, a spring biasing the cup toward the stop in opposition to the motion transmitted from the camming device to the cup, and a thrust member in a spline of the driven rotor and in thrust engagement between the cup and the pressure applying plate of the other clutch for transmitting to the last mentioned pressure plate the bias of said spring except as said bias is reduced by motion communicated to the cup from the camming device.

6. A combination according to claim 5 in which the spring is disposed within the cup and has a seat encircling the driven rotor.

7. In combination, a driven rotor provided with splines, first and second coupling devices encircling the rotor and each including a set of disks, each set including at least one disk engaged with a spline of the rotor and at least one other disk frictionally engageable with said one disk, means providing opposing shoulders on the rotor limiting the movement in opposite directions of the disks of the respective sets, each coupling device including a pressure plate, the plates being movable in opposite directions along the rotor toward the respective shoulder means, a cup movable axially of the rotor and engaged with one of said plates, a manually operable camming device upon the rotor between the coupling devices, a stop on the rotor abutted by the camming device, means for transmitting motion from the camming device to said cup in a direction away from said stop, a spring biasing the cup toward the stop in opposition to the motion transmitted from the camming device to the cup, and a thrust member in the said spline of the rotor and in thrust engagement between the cup and the pressure applying plate of the other coupling device for transmitting to the last-mentioned pressure plate the bias of said spring except as said bias is reduced by motion communicated to the cup from the camming device, a driving rotor co-axial with the driven rotor having means in splined connection with a disk of one of said couplings, and a cup having a fixed anchorage has splined connection with a disk of the other coupling, said other coupling comprising a brake when the disk of the last mentioned cup is frictionally engaged under pressure of said camming device with a disk splined to the driven rotor.

8. The combination of a splined driven rotor provided at axially spaced points with snap rings in grooves with which the rotor is provided, pairs of pressure plates in splined connection with the rotor, one such plate of each pair abutting one of said snap rings and the other such plate of each pair being movable toward the plate abutting the snap ring, clutch disks between said plates in a position to be frictionally engaged therebetween, a driving rotor with which at least one such disk is engaged between one set of plates, a stator with which at least one other such disk is engaged between a different set of plates, a push rod in a spline of the rotor abutting a plate of the first set, a cup abutted by said push rod and comprising a motion transmitting connection between the push rod and a plate of the other set, a spring provided with a seat on the driven rotor and another seat on the cup and acting on the cup with a bias holding said cup to the push rod and transmitting spring bias through the push rod to the plate of the first set, and means for relieving the first set of bias and concurrently applying pressure to the disks of the other set, said means comprising a manually operable ball cam device mounted upon the driven rotor between said sets and having a seat against the rotor and constituting means for transmitting motion away from said seat toward said cup.

References Cited

UNITED STATES PATENTS

| | | | |
|---|---|---|---|
| 2,009,301 | 7/1935 | Rode et al. | 192—18.1 |
| 2,193,068 | 3/1940 | Keck | 192—18.1 |
| 2,376,799 | 5/1945 | Miller | 192—18 X |
| 2,676,686 | 4/1954 | Fletcher | 192—18 X |
| 3,000,478 | 9/1961 | Carter | 192—18.1 |
| 3,127,969 | 4/1964 | Hansen. | |

BENJAMIN W. WYCHE III, *Primary Examiner.*